June 19, 1928.

J. A. STOUGH 1,674,073

STORAGE TANK

Filed Sept. 8, 1927

INVENTOR
Jay Albert Stough
By Arthur C. Brown
ATTORNEY

Patented June 19, 1928.

1,674,073

UNITED STATES PATENT OFFICE.

JAY ALBERT STOUGH, OF TULSA, OKLAHOMA.

STORAGE TANK.

Application filed September 8, 1927. Serial No. 218,211.

My invention relates to oil storage tanks and more particularly to means in combination with the metallic side wall of a tank for gathering static electricity generated over the tank roof and conducting same through the side wall to ground; the principal object of the invention being to protect a tank of this character from fire resulting from ignition of gases escaping from the tank by static electricity or lightning.

In accomplishing this and other objects of the invention I have provided improved details of structure, the preferred forms of which are illustrated in the accompanying drawings, wherein.

Figure 1:
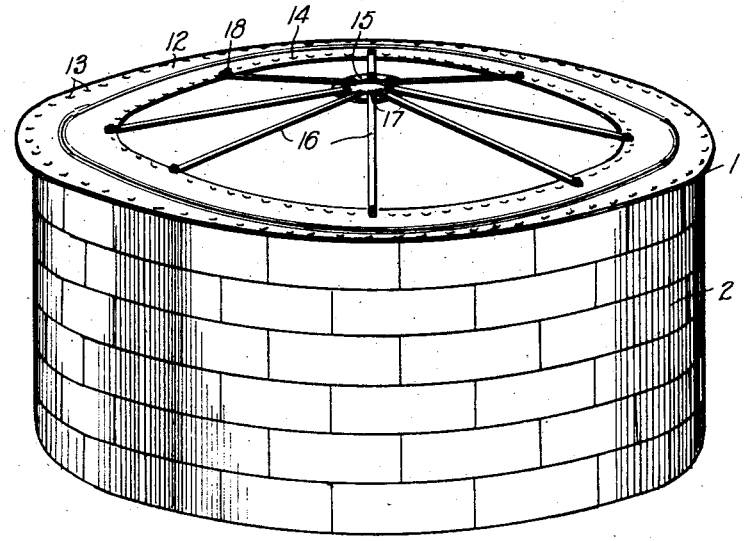
Fig. 1 is a perspective view of an oil storage tank embodying my invention.
Figure 2:
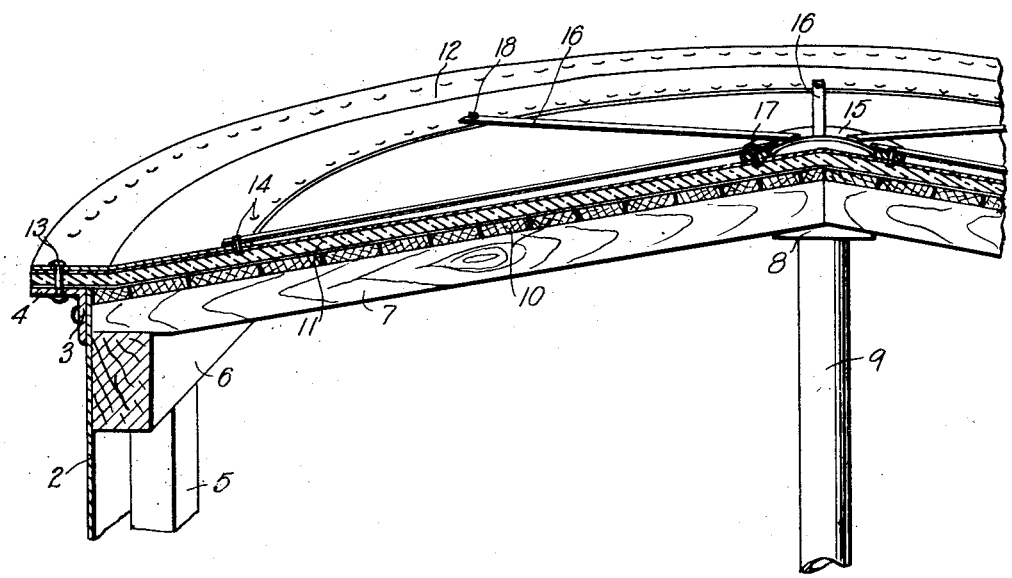
Fig. 2 is an enlarged vertical sectional perspective of the upper part of a tank wall and a part of the roof structure.

Referring more in detail to the drawings:

1 designates an oil storage tank of ordinary construction, except for the improvement hereinafter described, comprising a side wall 2 of sheet metal, having a metallic angle ring 3 riveted to its upper edge with the horizontal flange 4 extending outwardly. Posts 5, attached to the side wall, support beams 6, and girders 7 are supported from the beams and from an apex plate 8 on a center pillar 9. Sheathing 10 is laid on the girders and an insulated roof covering 11 is laid on the sheathing, the roof covering being composed of laminations of asbestos, fiber sheets, and gas-proof coatings for sealing the covering elements together and to the sheathing. The roof covering is of a nature to render the roof as nearly gas and weather proof as possible and to insulate the tank from sun rays and thereby maintain a low temperature within the tank and limit vaporization of contents of the tank.

The roof covering 11 is bound to the sheathing and to ring 3 by metallic rivets 13 and 14 which extend through the roof covering. Overlying the roof covering 11 at the apex of the roof structure is a metallic ring 15, which may be secured to the roof structure in any suitable way. Overlying the center ring 15 and the edge ring 12 are metallic strips 16, preferably secured to the respective rings by rivets 17 and 18.

It is well known by users of storage tanks of this general character that destructive fires are often occasioned by ignition of gases leaking from the tank roofs by static electricity generated over the roof or from lightning. With a tank equipped with my improvement, the relatively small amount of static electricity generated above the roof will be attracted to the metallic elements overlying the roof and conducted through the side wall of the tank to ground; the electricity collected by the apex ring being conducted through the metallic strips to the edge ring 12 and thence through rivets 13, the angle ring 3 to the side wall and thence to the ground.

While the principal object of the invention is the collection and disposition of static electricity, the conductors also constitute a safeguard from lightning, on the principal of the ordinary lightning rod.

What I claim and desire to secure by Letters Patent is:

1. A tank of the character described including a metallic side wall, a roof covering of insulating material, a metallic ring at the outer edge of the roof covering in conductive relation with said side wall, a metallic ring at the center of the roof covering, and conductors connecting said rings.

2. A tank of the character described, including a metallic side wall, a roof covering of insulating material, a metallic ring binding the outer edge of said covering and having conductive relation with the side wall, an inner ring overlying the roof covering, and conductors connecting the rings and spaced from the roof covering.

3. A tank of the character described including a metallic side wall, a metallic angle ring at the top of said wall, a roof covering overlying said ring, a metallic ring plate overlying the outer edge of the roof covering and riveted to said angle ring, a metallic ring at the center of the roof covering, and metallic strips overlying said center and plate rings and spaced from the roof covering, providing conduction from the center ring through the plate ring, the angle ring and side wall to ground.

In testimony whereof I affix my signature.

JAY ALBERT STOUGH.